UNITED STATES PATENT OFFICE 3,272,839
Patented Sept. 13, 1966

3,272,839
SUBSTITUTED METHYLHYDRAZINE
COMPOUNDS
Werner Bollag, Basel, Hugo Gutmann, Reinach, Balthasar
Hegedus, Binningen, Ado Kaiser, Neu-Frenkendorf,
Albert Langemann, Binningen, Marcel Muller, Reinach,
and Paul Zeller, Allschwil, Switzerland, assignors to
Hoffmann-La Roche Inc., Nutley, N.J., a corporation
of New Jersey
No Drawing. Filed Apr. 20, 1965, Ser. No. 449,636
Claims priority, application Switzerland, Sept. 29, 1961,
11,355/61
16 Claims. (Cl. 260—304)

The present application is a continuation-in-part of
Serial No. 226,460, filed September 26, 1962, and now
abandoned.

The present invention relates to novel compounds.
More specifically, it relates to novel substituted hydrazine
compounds of the formula $$A-NH-NH-CH_3 \qquad (I)$$

and corresponding azo and azoxy compounds, as well as
salts thereof,
wherein A is selected from the group consisting of saturated aliphatic hydrocarbon, unsaturated aliphatic hydrocarbon, and cycloaliphatic hydrocarbon groups substituted by at least one substituent selected from the
group consisting of halogen, aminoalkoxy, carbamoyl,
acyl, methylhydrazinomethyl, methylhydrazinoalkoxy,
methylhydrazinoalkylcarbonyl, ureido, thioureido, acylamino, amidino, allophanoyl and guanidino.

By corresponding azo and azoxy compounds, are meant
respectively, compounds of the formulae:

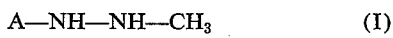

wherein A has the same meaning as above.

The group A in Formula I above can, for example, be
an alkyl, alkenyl, or cycloalkylmoiety substituted, for example, by the following:

halogen atoms such as bromine, iodine, fluorine and
chlorine, with the latter two being preferred;

primary, secondary and tertiary amino-lower alkoxy
groups, such as 2-amino-ethoxy, lower alkylamino-lower
alkoxy, e.g. 1-methyl-2-ethylamino-ethoxy, di-lower alkylamino-lower alkoxy, e.g. 3-dimethylamino-propoxy;

acylamino groups wherein the acylating moiety can be
formed from aliphatic, aromatic or heterocyclic acids
and the amino group of which can be primary or secondary such as acylamino groups of the formulae

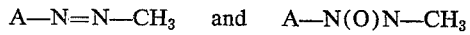

wherein Q is selected from the group consisting of lower
alkyl, phenyl and a monocyclic, 5 to 6 membered heterocyclic moiety containing 1 to 2 hetero atoms being
oxygen or nitrogen and wherein the heterocyclic moiety
can bear a lower alkyl substituent; P is selected from the
group consisting of hydrogen and lower alkyl; and Z
is selected from the group consisting of phenyl and
lower alkylene;
illustrative acylamino groups of the above formulae are
lower alkanoylamino groups, for example, acetylamino,
N-acetyl-N-methylamino, N-[2 - (2 - methylhydrazino)-
ethyl] - acetylamino and pivaloylamino; aroylamino
groups, for example, benzoylamino and phthalimido;
heterocyclic acylamino groups wherein the hetero moiety
is a one to two hetero atom nitrogen and/or oxygen
containing 5 to 6 membered heterocyclic ring as well
as heterocyclic acylamino groups wherein the heterocyclic
ring bears further substituents such as lower alkyl, for
example, nicotinoylamino, isonicotinoylamino, (methylisoxazolylcarbonyl)-amino and (methyloxazolylcarbonyl)-amino;

ureido or thioureido groups, the hydrogen atoms of
which can be in part or completely replaced by saturated
or unsaturated aliphatic, cycloaliphatic, araliphatic, aromatic or heterocyclic radicals which themselves can bear
further functional groups, for example, phenylureido,
lower alkyl-ureido groups such as methylureido, isopropylureido, and lower alkylureido groups wherein the lower
alkyl moiety is substituted by, for example, hydroxy or
2 - methylhydrazino such as hydroxyethyl-ureido, [2-(2-methylhydrazino)-ethyl]-ureido;

guanidino groups, the hydrogen atoms of which can be
in part or completely replaced by saturated or unsaturated
aliphatic, cycloaliphatic, araliphatic, aromatic or heterocyclic radicals which themselves can bear further functional groups, for example, lower alkylguanidino groups
such as methylguanidino, isopropylguanidino, and lower
alkylguanidino groups where the lower alkyl moiety is
substituted by, for example, hydroxy such as (hydroxyethyl)-guanidino;

amidino groups, the hydrogen atoms of which can be
in part or completely replaced by saturated or unsaturated
aliphatic, cycloaliphatic, araliphatic, aromatic or heterocyclic radicals which themselves can bear further functional groups, for example, lower alkylamidino groups
such as methylamidino, di-lower alkylamidino groups such
as diisopropylamidino, cyclo-lower alkylamidino groups
such as cyclopropylamidino, such groups wherein the
lower alkyl moiety is substituted by hydroxy such as (hydroxyethyl)-amidino or phenyl such as benzylamidino,
phenylamidino and isoxazolylamidino;

carbamoyl groups, the hydrogen atoms of which can be
replaced by saturated or unsaturated aliphatic, aromatic
or alicyclic radicals which themselves can bear further
functional groups or aromatic or heterocyclic radicals, for
example, mono and di-lower alkylcarbamoyl such as N-methylcarbamoyl, N,N-dimethylcarbamoyl, N-isopropylcarbamoyl, N-isobutylcarbamoyl, N-tert.-butylcarbamoyl,
N,N-diisopropylcarbamoyl, N-tert.-amylcarbamoyl, N-tert.-octylcarbamoyl; N - phenylcarbamoyl; N-benzothiazolylcarbamoyl; N - (lower alkylthio-lower alkyl) - carbamoyl groups such as methylthioethylcarbamoyl; N-(carbamoyl lower alkyl)-carbamoyl groups such as carbamoylmethylcarbamoyl; N - (lower alkylsulfonyl - lower
alkyl)-carbamoyl groups such as methylsulfonylethylcarbamoyl; N - (halo-lower alkyl)-carbamoyl groups such as
β-chloroethylcarbamoyl and β,β,β-trifluoroethylcarbamoyl; N - (lower alkenyl)-carbamoyl groups such as N-allylcarbamoyl; N-aralykylcarbamoyl groups, for example
phenyl-lower alkyl carbamoyl groups such as benzylcarbamoyl; N-furfurylcarbamoyl; N-cyclo-lower alkylcarbamoyl groups such as N-cyclopropylcarbamoyl; N-(lower
alkylamino-lower alkyl) - carbamoyl and N - (di-lower
alkylamino-lower alkyl)-carbamoyl groups such as β-methylaminoethylcarbamoyl and diethylaminoethylcarbamoyl; N-(2-methylhydrazino-lower alkyl)-carbamoyl
groups such as β - (β - methylhydrazino)-ethylcarbamoyl;
and N,N - (lower alkylene)carbamoyl groups such as
N,N - tetramethylenecarbamoyl and N,N-pentamethylenecarbamoyl;

allophanoyl groups, the hydrogen atoms of which can
be in part or completely replaced by saturated or unsaturated aliphatic, cycloaliphatic, araliphatic, aromatic
or heterocyclic radicals which themselves can bear further functional groups, for example allophanoyl, 4-lower alkylallophanoyl such as 4-methylallophanoyl and 2-lower alkyl allophanoyl such as 2-isopropylallophanoyl;
(2-methylhydrazino)-methyl;
acyl radicals of lower aliphatic carboxylic acid, for example lower alkanoyl groups such as formyl, acetyl and propionyl, and of aromatic carboxylic acids, for example, benzoyl;
methylhydrazino-lower alkoxy radicals, for example, $\beta$ - ($\beta$ - methylhydrazino)-ethoxy;
methylhydrazino-lower alkyl-carbonyl, for example $\beta$-($\beta$-methylhydrazino)-acetyl.

The alkyl, alkenyl or cycloalkyl moieties which bear the above described substituent are themselves preferably alkyl of up to 10 carbon atoms such as n-propyl, n-butyl, n-pentyl, n-hexyl and n-decyl, lower alkenyl such as 2-butenyl, and cyclo-lower alkyl such as cyclopropyl and cyclohexyl.

Some preferred compounds within the scope of Formula I above are:
1,3-bis-($\beta$-methylhydrazino)-propane,
1,4-bis-($\beta$-methylhydrazino)-butane,
1,3-bis-($\beta$-methylhydrazino)-2-methyl-propane,
1,4-bis-($\beta$-methylhydrazino)-2-butene,
cis-1,2-bis-($\beta$-methylhydrazino)-cyclopropane,
trans-1,2-bis-($\beta$-methylhydrazino)-cyclopropane,
1-methyl-2-(3-chloro-2-butenyl)-hydrazine.

Some preferred groups of compounds within the scope of Formula I above are:
(1) Compounds of the formula:

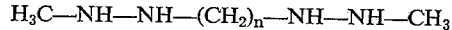
$$H_3C-NH-NH-(CH_2)_n-NH-NH-CH_3$$

wherein $n$ is an integer from 2 to 10.
(2) Compounds of the formula:

$$X-R-NH-NH-CH_3$$

wherein R is lower alkenylene and X is selected from the group consisting of halo and 2-methylhydrazino.

(3) Bis-(methylhydrazinomethyl)-cyclo-lower alkyl compounds of the formula:

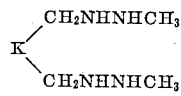

wherein K is cyclo-lower alkyl.

Other groups of compounds within the scope of Formula I above are:
(4) Compounds of the formula:

$$R''-O-R'-NHNHCH_3$$

wherein R' is alkylene of up to 10 carbon atoms and R'' is selected from the group consisting of lower alkanoyl, benzoyl, lower alkyl, lower alkenyl, phenyl-lower alkyl, and (2 - methylhydrazino)-lower alkyl (the last stated meaning of R'' is preferred).

(5) Compounds of the formula:

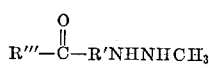

wherein R' is alkylene of up to 10 carbon atoms and R''' is selected from the group consisting of amino, anilino, benzothiazolylamino, lower alkyl, ureido, lower alkyl-ureido, hydroxy-lower alkyl-ureido (2-methylhydrazino)-lower alkyl-ureido, lower alkylamino, di-lower alkylamino, N - (lower alkylthio-lower alkyl)-amino, N-(carbamoyl-lower alkyl)-amino, N-lower alkylsulfonyl-lower alkyl)-amino, N-(halo-lower alkyl)-amino, N-lower alkenyl-amino, N - (phenyl-lower alkyl)-amino, N-furfuryl-amino, N-cyclo-lower alkylamino, N-(lower alkylamino-lower alkyl)-amino, N-(di-lower alkylamino-lower alkyl)-amino, N-(2 - methylhydrazino-lower alkyl)-amino and N,N-lower alkyleneamino (the first five stated meanings of R''' are preferred).

(6) Compounds of the formula:

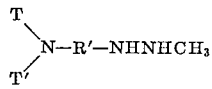

wherein R' is alkylene of up to 10 carbon atoms, T is selected from the group consisting of phenylcarbamoyl, lower alkyl, (2-methylhydrazino)-lower alkyl, lower alkanoyl, benzoyl, the residue of a naturally occurring α-amino acid devoid of its carboxy group, nicotinoyl, isonicotinoyl, methylisoxazolylcarbonyl, methyloxazolylcarbonyl, guanyl, lower alkyl-guanyl, hydroxy-lower alkyl-guanyl, carbamoyl, N-lower alkylcarbamoyl, N-(hydroxy-lower alkyl)-carbamoyl and N - [(2-methylhydrazino)-lower alkyl] - carbamoyl; and T' is selected from the group consisting of hydrogen and lower alkyl (preferred meaning for T is phenylcarbamoyl).

The compounds of Formula I can be prepared by reacting methylhydrazine, wherein the hydrogen atoms of the hydrazine group may partially be substituted by protecting groups such as acyl, carbalkoxy, carbobenzoxy or benzyl, with a compound yielding the moiety A'—, A' having the same meaning as A or is a substituent convertible into a substituent represented by A in Formula I;
or by methylation of a compound of the formula $$A'-NH-NH_2 \qquad (II)$$

wherein A' has the same meaning as indicated above and the hydrogen atoms of the hydrazine group may partially be substituted by protecting groups such as acyl (e.g. lower alkanoyl), carb-lower alkoxy, carbobenzoxy or benzyl;
if necessary converting the moiety A' in the resulting hydrazine into a moiety represented by A; if necessary splitting off such protecting groups as are present; and if desired converting the so-obtained product of Formula I into a salt.

One embodiment of the invention consists of reacting methylhydrazine or a methylhydrazine, the nitrogen atoms of which are partially substituted by protecting groups, with an agent yielding the radical A'—. This substitution can be effected, for example, by use of the following reagents:

1,2-dibromo-ethane,
1,3-dibromo-propane
1,3-dibromo-2-methyl-propane
1,4-dibromo-butane
1,5-dibromo-pentane
1,3-dibromo-2-methoxy-propane
bis-(2-bromoethyl)-ether
ethyl bromoacetate
bromoacetanilide
N-($\beta$-chloroethyl)-chloroacetamide
chloroacetonitrile
N,N-bis-($\beta$-chloroethyl)-ethylamine
N,N-bis-($\beta$-chloroethyl)-carbamic acid benzyl ester
N,N-bis-($\beta$-chloroethyl)-acetamide
1,1-bis-($\beta$-chloroethyl)-urea
1,3-bis-($\beta$-chloroethyl)-urea
chloroacetone
1,3-dichloroacetone
1,4-dibromo-2-butene
1,3-dichloro-2-butene
1,2-bis-iodomethyl-cyclopropane
1,3-bis-(p-tosyloxymethyl)-cyclohexane When using a dihalo compound as reagent it is convenient to use two moles of methylhydrazine, thereby forming compounds bearing two methylhydrazino groups. It is suitable in order to introduce the moiety A'— to first convert the hydrazine compound into a salt, preferably by treatment with an alkali metal alcoholate in an alcoholic solution. After removal of the alcohol, the resulting salt is advantageously dissolved in an inert solvent, for example, dimethylformamide, and treated with an A'— yielding agent, preferably at an elevated temperature. The reaction product can be purified by conventional methods, for example by extraction, crystallization or distillation.

The introduction of the desired moiety can also be effected by a reaction of methylhyldrazine or methylhydrazine partially substituted by protecting groups, for example, 1-methyl-1-acetyl-hydrazine, with a carbonyl compound, followed by reduction of the so-formed hydrazone, as well as eventual splitting off of the protecting groups. This reaction can suitably be effected by a short heating of the reaction components in a solvent, such as for example, alcohol and reduction of the resulting hydrazone in the presence of a hydrogenation catalyst, such as palladium or platinum.

According to another embodiment of the invention, hydrazine compounds of Formula II are methylated. This methylation can be conducted, for example, with the help of a methylating agent, such as, methyliodide or dimethylsulfate, under the conditions previously described for the introduction of the radical A'—.

By the introduction of the methyl group can also be effected by reaction of a compound of Formula II above with formaldehyde, followed by a reduction of the hydrazone formed, preferably in the presence of a hydrogenation catalyst, such as palladium or platinum.

Any protecting groups present in the reaction products can be split off according to known procedures.

The hydrazine compounds obtained may be oxidised. The degree of oxidation depends on the oxidation agent used. Weak oxidation agents such as mercuric oxide lead the hydrazine compounds to azo compounds, whereas stronger oxidation agents such as peracids lead the hydrazine compounds to azoxy compounds.

Where necessary, the conversion of the moiety A' into the moiety A can be effected in the above described reaction procedures at any point of time. Thus, it is advantageous, for example, to prepare substituted carbamoyl compounds from a (2-methyl-1,2-dicarbobenzoxy-hydrazino)-alkanoic acid, such as 2-(2-methyl-1,2-dicarbobenzoxy-hydrazino)-acetic acid, itself obtained by saponification of corresponding methyl or ethyl esters, via reaction with amines in accord with known methods of amidation. Suitably, the acid is converted into a reactive derivative, for example, into an acid chloride or a mixed anhydride, for example with a carbonic acid monoester or into an activated ester, for example, a cyanomethylester. The acid can also be amidated directly via use of a condensation agent such as dicyclohexylcarbodiimide. Protecting groups, such as carbobenzoxy groups, are subsequently removed from carbamoyl compounds obtained according to this method by hydrogenolysis or treatment with a hydrogen bromide/glacial acetic acid solution. The resulting hydrobromides obtained by the later method can, if desired, be converted into corresponding free bases and/or into other salts.

The acylamino substituted compounds of the invention are preferably prepared via acylation of an appropriate amino compound. The acylation can be effected, for example, by use of a reactive derivative of the desired carboxylic acid or sulfonic acid, or from the free acid by use of a condensation agent such as dicyclohexylcarbodiimide. The subsequent removal of the protecting groups can be effected in ways known per se; for example, by hydrogenolysis or hydrolysis with hydrogen bromide in glacial acetic acid. Accessible from the same intermediate amino compounds are ureido compounds via treatment with cyanates, as well as guanidines, by treatment with cyanamide and its derivatives (for example, methylisothiourea sulfate).

Amidino or substituted amidino compounds of Formula I are advantageously prepared from suitable nitriles, the hydrazine group of which is substituted by protecting groups, by the corresponding imido ether, which can be obtained via reaction of the nitrile with alcohol and mineral acid. By reaction of the amido ether with ammonia or a primary or secondary amine, the desired amidino compound is obtained. The nitriles can also be reacted directly with salts of amines, for example, isopropylamine hydrochloride or isopropylamine tosylate at elevated temperatures, and subsequent removal of the protecting groups.

The substituted hydrazine compounds of Formula I form pharmaceutically acceptable acid addition salts with both pharmaceutically acceptable inorganic and organic acids, such as, for example, hydrohalic acids, as hydrogen chloride, hydrogen bromide, hydrogen iodide, as well as other mineral acids, such as sulfuric acid, phosphoric acid, nitric acid, and with organic acids, such as tartaric acid, citric acid, oxalic acid, camphor-sulfonic acid, ethanesulfonic acid, toluenesulfonic acid, salicylic acid, ascorbic acid, maleic acid, mandelic acid, and the like. Preferred salts are the hydrohalides, especially the hydrochloride. The acid addition salts can suitably be prepared via treatment of the hydrazine derivative in an inert solvent with the corresponding acid.

The compounds of Formula I are active cytostatic agents. They inhibit the growth of transplantable tumors in both mice and rats. Thus, they are active, for example, against Walker tumors, Erlich carcinoma, Erlich ascites carcinoma, and the like. Also these compounds cause decomposition of macromolecular desoxyribonucleic acid in solution. The compounds can be administered internally in the form of conventional pharmaceutical preparations for example, the bases of Formula I or their pharmaceutically acceptable acid addition salts can be administered in conventional enteral or parenteral pharmaceutical excipients containing organic and/or inorganic inert carriers, such as water, gelatine, lactose, starch, magnesium stearate, talc, plant, oils, gums, alcohol, Vaseline, or the like. The pharmaceutical preparations can be in conventional solid forms for example, tablets, dragées, suppositories, capsules, or the like, or conventional liquid forms, such as suspensions, emulsions, or the like. If desired, they can be sterilized and/or contain conventional pharmaceutical adjuvants, such as, preservatives, stabilizing agents, wetting agents, emulsifying agents, buffers, or salts used for the adjustment of osmotic pressure. The pharmaceutical preparations can also contain other therapeutically active materials.

The following examples are illustrative, but not limitative of the invention. All temperatures are in degrees centigrade.

*Example 1*

26 g. of 1-methyl-1,2-diacetylhydrazine was added to a solution of 4.6 g. of sodium in 150 ml. of absolute ethanol. The solution was evaporated in vacuo to dryness and the residue heated to 160–170° for fourteen hours with 19 g. of ethylene bromide. The reaction product was poured into ice water and extracted with methylene chloride. There was thus obtained a thick oil, which was recrystallized from ethyl ether/ethyl acetate and then recrystallized several times from ethyl acetate, yielding 1,2-bis-(2-methyl-1,2-diacetylhydrazino)-ethane melting at 134°.

2. g. of the so-obtained tetraacetate was heated on a steam bath for two hours with 20 ml. of concentrated hydrochloric acid. After the addition of a small amount of water, the mixture was extracted with methylene chloride, and the aqueous phase concentrated in vacuo to dryness, yielding white crystals which were crystallized from ethanol, yielding 1,2-bis-(2-methyl-hydrazino)-ethane dihydrochloride melting at 123–124°.

*Example 2*

38 g. of 1-methyl-1,2-dibenzoylhydrazine and 15 g. of 1,3-dibromopropane were added to a solution of 3.45 g. of sodium in 100 ml. of absolute ethanol. The resulting solution was heated at reflux for two hours, poured into water, and extracted with ether. The ether extract was twice washed with dilute sodium hydroxide and then with water, dried with sodium sulfate and evaporated to dryness. 29 g. of the so-obtained glassy product was heated for two hours with 150 ml. of concentrated hydrochloric acid on the steam bath. The reaction mixture was then diluted with water, extracted with methylene chloride, and the aqueous phase evaporated in vacuo to dryness, yielding very hygroscopic crystals of 1,3-bis-(2-methyl-hydrazino)-propane dihydrochloride, which after recrystallization from ethanol/ether, melted at 92–95°.

In an analogous manner the following were prepared:

1,4-bis-(2-methyl-hydrazino)-butane dihydrochloride, which melted at 160–162°;
1,5-bis-(2-methyl-hydrazino)-pentane/dihydrochloride, which melted at 100–120°;
1,6-bis-(2-methyl-hydrazino)-hexane trihydrochloride, which melted at 182–184°;
1,10-bis-(2-methyl-hydrazino)-decane dihydrochloride, which melted at 106–108°.

*Example 3*

38 g. of 1-methyl-1,2-dibenzoylhydrazine and 17.5 g. of di-β-bromethyl ether were added to a solution of 3.45 g. of sodium in 100 ml. of absolute ethanol. The reaction mixture was heated for 20 hours at reflux. It was then permitted to cool, the ethanol removed in vacuo and the residue partitioned between water and methylene chloride/ethyl ether (1:2). The organic layer was washed with dilute sodium hydroxide and water, dried with sodium sulfate and the solvents evaporated off in vacuo. The so-obtained thick oil was heated for two hours with 200 ml. of concentrated hydrochloric acid on a steam bath. After the reaction solution had cooled, it was extracted with methylene chloride and the aqueous phase evaporated to dryness in vacuo, yielding a very hygroscopic hydrochloride, which was dissolved in 100 ml. of water and filtered through 300 g. of Dowex 1. The so-obtained aqueous solution of the free base was concentrated in vacuo and the residue distilled in a high vacuum. The so-obtained 2,2′-bis-(2-methyl-hydrazino)-diethyl ether distilled at 78–82°/0.05 mm. Hg; $n_D^{25}=1.4736$.

*Example 4*

71.5 g. of 1-methyl-1,2-dicarbobenzoxy-hydrazine was dissolved in 125 ml. of 2 N sodium methylate solution. 29.7 g. of 1,3-dichloro-2-butene was then added thereto and the resulting mixture heated for one hour at reflux. The reaction mixture was then concentrated in vacuo, mixed with ice water and extracted with ethyl ether. The ether layer was washed with diluted sodium hydroxide and water, dried with sodium sulfate and concentrated in vacuo. The amorphous residue was dissolved in 250 ml. of 33 percent solution of hydrogen-bromide in glacial acetic acid, and the resulting solution permitted to stand for twenty-four hours, whereupon 1-methyl-2-(3-chlor-2-butenyl)-hydrazine dihydrobromide crystallized. After recrystallization from glacial acetic acid it melted at 104–110°.

*Example 5*

39.3 g. of 1,4-dibromo-2-butene was added to a solution of 113.5 g. of 1-methyl-1,2-dicarbobenzoxy-hydrazine and 300 ml. of dimethylformamide which contained 9 g. of sodium hydride. The resulting mixture was heated for one hour at 80° and worked up as in Example 4 above, yielding a thick oil which was permitted to stand for 24 hours in 600 ml. of a 33 percent solution hydrogenbromide in glacial acetic acid. 1,4-bis-(2-methyl-hydrazino)-2-butene dihydrobromide precipitated and after recrystallization from ethanol/water, melted at 192–194°.

*Example 6*

With stirring and slight cooling to 20–30°, a solution of 63.5 g. of 1-methyl-1,2-dibenzoylhydrazine in 160 ml. of dimethylformamide was added to a solution of 6 g. of sodium hydride in 100 ml. of dimethylformamide. To the so-obtained mixture there was then added a solution of 34 g. of trans-1,4-bis-(bromomethyl)-cyclohexane in 35 ml. of dimethylformamide. The resulting mixture was heated for 15 hours at 55°. Most of the dimethylformamide was then distilled off in vacuo, the residue poured into 1 N sodium hydroxide and extracted with a mixture of ethyl ether and methylene chloride. The ethyl ether/methylene chloride extract was washed with 1 N sodium hydroxide and with water, dried with sodium sulfate and evaporated. The residue crystallized upon trituration with ethyl ether and the so-obtained crystalline 1,4-bis-(methyl - dibenzoylhydrazinomethyl)-cyclohexane melted at 167–175°.

45 g. of the so-obtained product in a mixture of 250 ml. of acetic acid and 250 ml. of concentrated hydrochloric acid was boiled for 2½ hours in a nitrogen atmosphere. After the mixture cooled the precipitated product was filtered off with suction, washed with concentrated hydrochloric acid and ethyl ether and recrystallized from methanol/ethyl ether. The so-obtained hydrochloride of trans - 1,4 - bis-(methyl-hydrazinomethyl)-cyclohexane melted at 190–191°.

*Example 7*

With stirring and slight cooling to 20–30°, a solution of 254 g. of 1-methyl-1,2-dibenzoylhydrazine and 650 ml. of dimethylformamide was added to a solution of 24 g. of sodium hydride in 400 ml. of dimethylformamide. There was then added thereto a solution of 227 g. of cis-1,2-bis-(p-tolylsulfonyloxymethyl)-cyclohexane in 600 ml. of dimethylformamide, and the resulting mixture heated at 75–80° for 20 hours. Most of the dimethylformamide was then distilled off in vacuo and the residue was poured into 1 N sodium hydroxide and extracted with a mixture of ethyl ether and methylene chloride, the ethyl ether/methylene chloride extract washed with 1 N sodium hydroxide and with water, dried with sodium sulfate and evaporated.

The residual cis - 1,2 - bis-(methyl-dibenzoylhydrazinomethyl)-cyclohexane, a viscous oil, was poured without further purification into 2.7 liters of ethanol and, following the addition of a solution of 530 g. of potassium hydroxide and 475 ml. of water, boiled for 15 hours under a nitrogen atmosphere. The reaction mixture was then concentrated under reduced pressure, the concentrate saturated with solid potassium hydroxide and mixed with ether. The resulting ether phase was filtered, dried with potassium hydroxide and evaporated. The residual cis-1,2-bis-(methyl-hydrazinomethyl)-cyclohexane was purified by fractional distillation. The distillate was a colorless oil which boiled at 91–93°/0.02 mm. Hg.

Upon treatment of the base in an alcoholic solution with an alcoholic solution of 2 equivalents of oxalic acid, the dioxalate crystallized out. After recrystallization from water/ethanol it melted at 160–162°.

In an analogous manner the following were prepared:

trans-1,2-bis-(methylhydrazinomethyl)-cyclohexane, boiling point 89–90°/0.04 mm. Hg;
cis-1,3-bis-(methylhydrazinomethyl)-cyclohexane, boiling point 95–98°/0.01 mm. Hg.

*Example 8*

With stirring and slight cooling to 20–30°, a solution of 67 g. of 1-methyl-1,2-dibenzoylhydrazine in 170 ml. of dimethylformamide was added to a solution of 6.3 g. of sodium hydride in 100 ml. of dimethylformamide. A solution of 40 g. of trans-1,2-bis-(iodo-methyl)-cyclopropane in 50 ml. of dimethylformamide was then added thereto, and the resulting mixture heated for two hours at 40°. Most of the dimethylformamide was then distilled off in vacuo, the residue poured into 1 N sodium hydroxide and extracted with a mixture of ethyl ether and methylene chloride. The ethyl ether/methylene chloride extract was washed with 1 N sodium hydroxide, water, 5 percent sodium thiosulfate and water, dried with sodium sulfate and evaporated.

The residual trans-1,2-bis-(methyl-dibenzoylhydrazino-methyl)-cyclopropane, a viscous oil, was dissolved without further purification in 800 ml. of ethanol and, following the addition of a solution of 65 g. of potassium hydroxide in 60 ml. of water, boiled for 16 hours under a nitrogen atmosphere. The reaction product was concentrated under reduced pressure, the concentrate saturated with solid potassium hydroxide and treated with ether. The ether phase was filtered, dried with potassium hydroxide and evaporated. The residual trans-1,2-bis-(methyl-hydrazinomethyl)-cyclopropane was purified by distillation yielding a colorless oil which boiled at 88°/0.04 mm. Hg and which upon cooling congealed to a crystalline mass which melted at about 30°.

*Example 9*

Cis - 1,2 - bis-(methyl-hydrazino-methyl)-cyclopropane was prepared according to the procedure of Example 8 and boiled at 74°/0.02 mm. Hg.

The above-required trans- or cis-1,2-bis-(iodo-methyl)-cyclopropane starting materials were prepared as follows: Cyclopropane-1,2-dicarboxylic acid diethylester was reduced in ethyl ether with lithium aluminum hydride to 1,2-bis-(p-hydroxymethyl)-cyclopropane. In pyridine at −5 to −10° this was treated with p-toluenesulfonylchloride, whereby there was obtained 1,2-bis-(p-tolylsulfonyl-oxymethyl)-cyclopropane (transform, M.P. 76–76½°; cis-form, M.P. 88–89°). Upon boiling the toluenesulfonicacid ester with sodium iodide in acetone, there was obtained the corresponding iodide: trans-1,2-bis-(iodo-methyl)-cyclopropane, M.P. 10–11°; cis - 1,2 - bis - (iodo-methyl)-cyclopropane, M.P. 59–60°. Besides iodo-methyl, the other halomethyl compounds can also be used, for example, 1,2-bis-(chloro, bromo or fluoromethyl)-cyclopropane.

*Example 10*

To a solution of 12.5 g. of sodium in 520 ml. of absolute methanol cooled to 20°, there was added at one time 71 g. of 1-methyl-1,2-diacetylhydrazine mixed with 50 ml. of absolute ethanol, and directly thereafter 80 g. of bromoacetic acid ethyl ester. The mixture was then heated for two hours at reflux, cooled to 20°, neutralized with glacial acetic acid and evaporated in vacuo. The oily residue was twice partitioned with 700 ml. of chloroform and 300 ml. of water. The chloroform layer was separated and the aqueous phase extracted once with 300 ml. of chloroform. The combined chloroform extracts were then dried with sodium sulfate and evaporated in vacuo. The so-obtained oily residue was distilled, and, after a short time, there distilled at 116°/0.01 mm. Hg, 1-methyl-1,2-diacetyl-2-carboethoxy-methylhydrazine as a nearly colorless oil; $n_D^{24}=1.4652$.

20 g. of the above-described diacetyl compound in 150 ml. of concentrated aqueous hydrochloric acid was heated on steam bath for 1½ hours under a nitrogen atmosphere. The yellow solution was then evaporated in vacuo, and teh crystalline residue twice recrystallized from water-methanol yielding 1-methyl-2-carboxymethylhydrazine monohydrochloride melting at 168° (dec.).

*Example 11*

73.1 g. of 1-methyl-1,2-diacetyl-2-carboethoxy-methylhydrazine in 300 ml. of absolute methanol was heated for 6 hours at reflux, in the course of which hydrogen chloride was introduced into the solution. Then the solution was evaporated in vacuo and the oily residue dissolved in 200 ml. of concentrated aqueous ammonia solution. The solution was then maintained for 6 hours at 20°, evaporated in vacuo and the crystalline residue recrystallized three times from methanol/water, yielding 1-methyl-2-carbamoylmethylhydrazine monohydrochloride melting at 165°.

*Example 12*

To a suspension of 4.6 g. of sodium in 300 ml. of absolute dimethylformamide cooled to 10° there was added at one time, 62.8 g. of 1-methyl-1,2-dicarbobenzoxy-hydrazine in 100 ml. of absolute dimethylformamide and, immediately thereafter, 43 g. of bromacetanilide in 100 ml. of absolute dimethylformamide.

The mixture was then heated for 4 hours at 100°, evaporated in vacuo, and twice partitioned between water (300 ml.) and chloroform (700 ml.). The chloroform solution was separated, dried in sodium sulfate and evaporated in vacuo. The oily residue crystallized upon treatment with methanol, and after three recrystallizations from methanol, yielded 1-methyl - 1,2 - dicarbobenzoxy-2-carbanilinomethyl hydrazine melting at 103–109°.

44.7 g. of the above-described dicarbobenzoxy compound was hydrogenated in 200 ml. of methanol over 5 g. of palladium carbon (5 percent) under atmospheric pressure and at room temperature. After termination of the hydrogen absorption, the catalyst was filtered off, the filtrate adjusted to a pH of 3 by treatment with ethereal hydrochloric acid and then evaporated in vacuo. 1-methyl-2-carbanilinomethyl-hydrazine monohydrochloride was isolated from the oily residue by several recrystallizations from methanol/methyl ether and melted at 176° (dec.).

*Example 13*

19.0 g. of bis-(2-methylhydrazino)-butane dihydrochloride was suspended in 100 ml. of methylene chloride. Following the addition of 80 g. of potassium hydroxide in 50 ml. of water, the mixture was thoroughly shaken, the methylene chloride layer separated and the aqueous phase extracted twice with methylene chloride. The combined methylene chloride extracts were dried with potassium carbonate and then evaporated in vacuo. The residual oil was dissolved in 100 ml. of absolute ether. This solution was cooled in an ice bath and, in portions, 37 g. of yellow mercuric oxide added thereto. The resulting mixture was permitted to stand for a half hour at 25°, filtered, evaporated to dryness, and the residual oil distilled in vacuo yielding 1,4-bis-methylazo-butane boiling at 63–64°/15 mm. Hg, $n_D^{24}=1.4353$.

*Example 14*

8.5 g. of 1,4-bis-methylazo-butane was dissolved in 50 ml. of methylene chloride. The solution was cooled to 0° and in the course of 2 hours, with stirring and ice cooling, a solution of 18.9 g. of perbenzoic acid in 600 ml. of methylene chloride added thereto. The mixture was then stirred for a further hour at 0°. The methylene chloride solution was then rapidly shaken, first with 500 ml. of 10 percent potassium hydroxide and then with 300 ml. of saturated sodium sulfate solution, then washed with saturated sodium carbonate solution and water, dried over sodium sulfate, the solvent evaporated and the residue distilled in vacuo, yielding 1,4-bis-methylazoxybutane boiling at 96–97°/0.4 mm. Hg $n_D^{25}=1.4849$.

*Example 15*

21 g. of 1-(p-toluene-sulfonyloxy)-hexyne-(5) were dissolved in 60 ml. of absolute dimethylformamide and added drop by drop within 20 minutes with stirring to a solution of 16.8 g. of sodium diacetyl-methylhydrazine in 40 ml. of absolute dimethylformamide. The mixture was stirred for a further hour at 70° centigrade, cooled and evaporated to dryness at 12 torr after the addition of 3.5 ml. of glacial acetic acid. The residue was shaken with 300 ml. of methylene chloride and 300 ml. of water. The methylene chloride phase was washed with 200 m. of water, dried over sodium sulfate and evaporated to dryness under reduced pressure. The oily residue was purified by distillation, yielding 1,2-diacetyl-1-methyl-2-(hexyne-(5)-yl)-hydrazine as a colourless oil, boiling at 139°/0.006 torr; $n_D^{23}=1.4868$.

12 g. of 1,2-diacetyl-1-methyl-2-(hexyne-(5)-yl)-hydrazine were dissolved in 25 ml. of methyl alcohol and added drop by drop with shaking to a mixture of 0.82 g. of mercuric oxide, 0.33 ml. of borontrifluoride etherate, 16.5 mg.

of trichloroacetic acid and 1.65 ml. of methyl alcohol in such a manner that the temperature of the reaction mixture did not exceed 50° C. The mixture was stirred for a further hour at room temperature. Thereafter 100 ml. of 2 N sulfuric acid were added, whereupon the mixture was extracted twice with 100 ml. of methylene chloride. The extracts were washed with 100 ml. of water and with 100 ml. of saturated sodium bicarbonate solution, combined, dried over sodium sulfate and evaporated to dryness at 12 torr. The oily residue was purified by distillation, yielding 1,2-diacetyl-1-methyl-2-(5-oxo-hexyl)-hydrazine as a colourless oil, boiling at 151° C./0.04 torr; $n_D^{25}=1.4784$.

10.5 g. of 1,2-diacetyl-1-methyl-2-(5-oxo-hexyl)-hydrazine were dissolved in 50 ml. of 25% aqueous ammonia and 40 ml. of methyl alcohol and hydrogenated in the presence of Raney-nickel (about 3 g.) at room temperature and atmospheric pressure. The hydrogenation subsided after 975 ml. of hydrogen had been taken up. The methyl alcohol was thereafter as far as possible distilled off under reduced pressure. The aqueous residue was extracted twice with each 50 ml. of methylene chloride. The extracts were washed twice with each 50 ml. of water, combined, dried over sodium sulfate and evaporated to dryness under reduced pressure. The remaining 1,2-diactyl-1-methyl-2-(5-amino-hexyl) - hydrazine could be converted into 1-methyl-2 - (5-amino-hexyl)-hydrazine without further purification.

8 g. of 1,2,-diacetyl-1-methyl-2-(5-amino-hexyl)-hydrazine were added to 100 ml. of 2 N hydrochloric acid and heated for 2 hours to boiling in a nitrogen atmosphere. The solution was thereafter evaporated to dryness. The crystalline residue was recrystallized three times from methyl alcohol. The obtained pure 1-methyl-2-(5-amino-hexyl)-hydrazine - dihydrochloride was extremely hygroscopic. The corresponding dioxalate formed colourless crystals, melting at 129–131° C.

The 1-(p-toluenesulfonyloxy)-hexyne-(5) used as starting material could be prepared as follows:

20 g. of hexyne-(5)-ol-(1) were dissolved in 30 ml. of absolute benzene and added drop by drop at —5° C. with stirring to a solution of 42 g. of toluenesulfochloride in 150 ml. of absolute pyridine. The reaction mixture was thereafter stirred for a further 15 hours at —10° C., then poured onto 500 g. of ice and extracted three times with 200 ml. of benzene. Each extract was extracted twice with 300 ml. of 2 N hydrochloric acid, once with 200 ml. of water and once with 200 ml. of a saturated sodium sulfate and evaporated to dryness under reduced pressure. The oily residue was purified by distillation, yielding 1-(p-toluenesulfonyloxy)-hexyne-(5) as a colourless oil, boiling at 148° C./0.1 torr; $n_D^{28}=1.5128$.

*Example 16*

28 g. of 1-(p-toluenesulfonyloxy)-octyne-(7) were dissolved in 70 ml. of dimethylformamide and added drop by drop at 70° C. within 30 minutes with stirring to a solution of 22.6 g. of sodium diacetyl-methylhydrazine in 50 ml. of absolute dimethylformamide. The reaction mixture was stirred for a further hour at 70° C. cooled and evaporated to dryness at 12 torr after the addition of ml. of glacial acetic acid. The residue was shaken with 300 ml. of methylene chloride and 300 ml. of water. The methylene chloride phase was washed with 200 ml. of water, dried over sodium sulfate and evaporated to dryness under reduced pressure. The remaining yellow oil was purified by distillation, yielding 1,2-diacetyl-1-methyl-2 - (octyne - (7) - yl)-hydrazine as a colourless oil, boiling at 148° C./0.15 torr; $n_D^{27}=1.4826$.

17.7 g. of 1,2-diacetyl-1-methyl-2-octyne-(7)-yl)-hydrazine were dissolved in 37 ml. of methyl alcohol and added drop by drop with shaking to a mixture of 24.3 mg. of trichloroacetic acid, 2.43 ml. of absolute methyl alcohol, 1.21 g. of mercuric oxide and 0.49 ml. of borontrifluoride etherate, in such a manner that the temperature of the reaction mixture did not exceed 50° C. The mixture was stirred for a further 3 hours at room temperature, whereafter 150 ml. of 2 N sulfuric acid was added, followed by extraction twice with 150 ml. of methylene chloride. The extracts were washed with 200 ml. of a saturated sodium bicarbonate solution, combined, dried over sodium sulfate and evaporated to dryness at 12 torr.

The oily residue was purified by distillation, yielding 1,2-diacetyl-1-methyl-2-(7 - oxo - octyl)-hydrazine as a colourless oil, boiling at 156–158° C./0.07 toor;
$$n_D^{25}=1.4756$$

14.4 g. of 1,2-diacetyl-1-methyl-2-(7-oxo-octyl)-hydrazine were added to 144 ml. of 2 N hydrochloric acid and heated to boiling for 2 hours in a nitrogen atmospher. The clear solution was evaporated to dryness at 12 torr in a water bath (40° C.). The crystalline residue was recrystallized three times from methyl alcohol/ether, yielding 1-methyl-2-(7-oxo-octyl)-hydrazine dihydrochloride as colourless crystals, melting at 120–123° C. (with decomposition).

The 1-(p-toluenesulfonyloxy)-octyne-(7) used as starting material could be prepared as follows:

10.3 g. of 1-hydroxy-octyne-(7) were dissolved in 12 ml. of absolute toluene and added drop by drop at —5 to —10° C. with stirring to a solution of 16.9 g. of p-toluenesulfochloride in 60 ml. of absolute pyridine within 20 minutes. The reaction mixture was stirred for a further 16 hours at —12° C., then poured onto 500 g. of ice and extracted completely with benzene. The benzene extracts were washed three times with each 250 ml. of 2 N aqueous hydrochloric acid, once with 500 ml. of water and once with 250 ml. of aqueous saturated sodium bicarbonate solution, combined, dried over sodium sufate and evaporated to dryness at 12 torr. The oily residue was purified by distillation, yielding 1-(p-toluenesulfonyloxy)-octyne-(7) as a colourless oil boiling at 160–162° C./0.07 torr; $n_D^{28}=1.5099$.

*Example 17*

A solution of 2.3 g. of sodium in 150 ml. of absolute ethyl alcohol was evaporated to dryness under reduced pressure. To the soild residue was added a solution of 33 g. of 1,2-dicarbobenzoxymethylhydrazine in 100 ml. of absolute dimethylformamide. Still present residues of ethyl alcohol were removed at 40° under reduced pressure. The faintly yellow solution was thereafter within half an hour added drop by drop at 5–10° C. with stirring to a solution of 45.2 g. of (1,2-dihydroxymethyl)-cyclohexane ditosylate in 100 ml. of absolute dimethylformamide. The reaction mixture was stirred for a further hour at room temperature and a further hour at 60° C. The dark solution was poured onto 1 kg. of ice and extracted twice with ether. The extracts were washed three times with 50 ml. of water, combined, dried over sodium sulfate and evaporated to dryness under reduced pressure. The remaining viscous yellow oil was dissolved in 90 ml. of benzene and after the addition of 120 ml. of petroleum ether adsorbed onto 900 g. of silicagel (Merck). The column was eluted with 5 l. of benzene. The cis-1-[(1,2-dicarbobenzoxy)-methylhydrazinomethyl]-2-hydroxymethyl-cyclohexene - tosylate which remained after exaporation of the elute, had the appearance of a viscous yellow oil and was further reacted without purification.

7.5 g. of potassium cyanide were dissolved in 18 ml. of water with warming and supplied with 80 ml. of dimethylformamide. This mixture was added drop by drop with stiring within 10 minutes to a solution of 22.8 g. of cis-1-[(1,2-dicarbobenzoxy)-methylhydrazinomethyl]-2-hydroxymethyl-cyclohexane tosylate in 70 ml. of dimethylformamide. The reaction mixture was stirred for 4 hours at 70° C., poured onto 500 g. of ice and extracted with 400 ml. of ether. The extract was washed three times with 50 ml. of water, dried over sodium sulfate and evaporated to dryness under reduced pressure. The remaining cis-1-[(1,2-dicarbobenzoxy)-methylhydrazinomethyl]-2-cyanomethyl-cyclohexane, a viscous yellow oil oil, was further reacted without purification.

8.2 g. of cis-1-[(1,2-dicarbobenzoxy)-methylhydrazinomethyl]-2-cyanomethyl-cyclohexane were dissolved in 100 ml. of methyl alcohol and shaken in a hydrogen atmosphere with .5 g. of 5% palladium carbon. After the calculated amount of hydrogen had been taken up, the solution was filtered off from the catalyst and immediately supplied with a solution of 1.5 g. of non-aqueous oxalic acid in 15 ml. of methyl alcohol. The solvent was evaporated off under reduced pressure, yielding a glassy mass, which was boiled with 100 ml. of ethyl alcohol and filtered hot. A jelly product which separated off after cooling was separated off and discarded. The clear filtrate was evaporated to dryness under reduced pressure, yielding cis-1-methylhydrazinomethyl-2-cyanomethyl-cyclohexane which after recrystallization twice from ethyl alcohol formed colorless crystals, melting at 115–117° C.

*Example 18*

A solution of 2.1 g. of sodium in 100 ml. of absolute ethyl alcohol was evaporated to dryness under reduced pressure. The solid residue was supplied with a solution of 32 g. of 1,2-dicarbobenzoxy-methyldrazine in 150 ml. of abolute dimethylformamide. Still present residues of ethyl alcohol were removed at 40° C. under reduced pressure. The faintly yellow solution was thereafter added drop by drop with stirring to a solution of 28 g. of ω-bromo-hendecanoid acid methyl ester in 50 ml. of absolute dimethylformamide. The reaction mixture thereby slightly heated spontaneously, was stirred for 3 hours at 80° C., poured onto 500 g. of ice and extracted three times with 300 ml. of ether. The extracts were washed with water, combined, dried over sodium sulfate and evaporated to dryness under reduced pressure, yielding ω-(1,2-dicarbobenzoxy) - methylhydrazino-hendecanoic acid methyl ester as a yellow oil, which was further reacted without purification.

38 g. of ω-(1,2-dicarbobenzoxy)-methylhydrazino-hendecanoic acid methyl ester were heated under reflux for 2 hours with a solution of 4.2 g. of potassium hydroxide in 150 ml. of 90% aqueous methyl alcohol. The methyl alcohol was thereafter evaporated to dryness under reduced pressure. The residue was taken up in 150 ml. of water. The clear solution (pH=9) was extracted twice with each 100 ml. of ether in order to remove non-converted starting material. The aqueous phase was adjusted to pH 1 by the addition of 6 N sulfuric acid and extracted three times with 100 ml. of ether. The extracts were dried and evaporated to dryness, yielding ω-(1,2-dicarbobenzoxy) - methylhydrazino - hendecanoic acid as a viscous yellow oil, which was further reacted without purification.

25 g. of ω-(1,2-dicarbobenzoxy)-methylhydrazino-hendecanoic acid were dissolved in 100 ml. of absolute benzene, supplied with 15 ml. of thionyl chloride and heated to boiling under reflux for one and a half hours. The solvent was evaporated to dryness under reduced pressure, yielding ω-(1,2-dicarbobenzoxy)-methylhydrazino-hendecanoyl chloride as a slightly yellow coloured oil, which was reacted further without purification.

26 g. of ω-(1,2-dicarbobenzoxy)-methylhydrazino-hendecanoyl chloride were dissolved in 100 ml. of absolute benzene and added with stirring to a mixture of 8 g. of 2-aminobenzothiazole and 5 g. of triethylamine in 100 ml. of absolute benzene. After standing for 2 hours at room temperature, the reaction mixture was shaken with 200 ml. of water and 200 ml. of ether. The ether phase was separated off, washed with water, with a saturated aqueous sodium bicarbonate solution and again with water, dried over sodium sulfate and evaporated to dryness under reduced pressure, yielding 1,2-dicarbobenzoxy - methylhydrazino - hendecanoylamino - benzothiazole as a yellow oil, which crystallized out after standing. By treatment with ether/petroleum ether colourless crystals were obtained, which after recrystallization from ether melted at 66–68° C.

5 g. of ω-(1,2-dicarbobenzoxy)-methylhydrazino-hendecanoylamino-benzothiazol were dissolved in 10 ml. of 30% hydrogen bromide in glacial acetic acid at room temperature. The precipitate, which formed after 6 hours, was filtered off, washed three times with 15 ml. of glacial acetic acid and recrystallized from ethyl alcohol/acetonitrile (1:1), yielding ω-methylhydrazino-hendecanoylamino-benzothiazole as colourless crystals, which after renewed recrystallization melted at 166–167° C.

*Example 19*

35 g. of ω-(1,2-dicarbobenzoxy)methylhydrazino-hendecanoic acid were converted into the corresponding acid chloride, working as in Example 18, dissolved in boiling dioxane and after the addition of 20 g. of urea, heated to 60–70° C. with stirring. Unreacted urea was filtered off. The filtrate was supplied with 200 ml. of water and extracted with 250 ml. of ethyl acetate. The extract was shaken twice with 50 ml. of a saturated sodium bicarbonate solution, three times with 50 ml. of water, dried over sodium sulfate and evaporated to dryness under reduced pressure. There was obtained ω-(1,2-dicarbobenzoxy)-methylhydrazino-hendecanoyl urea as a viscous, yellow oil, which was further reacted without purification.

15 g. of ω-(1,2-dicarbobenzoxy)-methylhydrazine-hendecanoyl urea were dissolved in 75 ml. of 30% hydrogen bromide in glacial acetic acid at room temperature. The precipitate which was formed after several hours of standing at room temperature was washed with 30 ml. of glacial acetic acid and 30 ml. of ether and thereafter dried under reduced pressure, yielding ω-methylhydrazino-hendecanoyl urea as a fine colourless powder, which after recrystallization from methyl alcohol formed slightly hygroscopic crystals, melting at 154–164° C.

*Example 20*

A solution of 1 g. of sodium in 70 ml. of absolute ethyl alcohol were evaporated to dryness under reduced pressure. To the solid residue was added a solution of 15 g. of 1,2-dicarbobenzoxy-methylhydrazine in 100 ml. of absolute dimethylformamide. Remaining residues of ethyl alcohol were removed at 40° C. under reduced pressure. To the slightly yellow solution there were thereafter added with stirring 15.4 g. of N-ω-bromodecyl-N'-phenyl urea. The reaction mixture was heated for 2 hours at 70° C., thereafter poured into 300 ml. of water and extracted twice with ether. The extracts were washed with water, combined, dried over sodium sulfate and evaporated to dryness under reduced pressure, yielding N-ω-(1,2-dicarbobenzoxy)-methylhydrazino-decyl-N'-phenyl urea, a viscous yellow oil that was further reacted without purification.

13 g. of N-ω-(1,2-dicarbobenzoxy)-methylhydrazino-decyl-N'-phenyl urea were dissolved in 40 ml. of 30% hydrogen bromide in glacial acetic acid. The crystals which precipitated after standing for 3 hours at room temperature were filtered off and recrystallized from ethyl alcohol/acetonitrile, yielding N-(ω-methylhydrazino)-decyl-N'-phenyl urea as colourless crystals, melting at 112–118° C.

The protecting groups could also be split off hydrogenolytically as follows:

13 g. of N-ω-(1,2-dicarbobenzoxy)-methylhydrazino-decyl-N'-phenyl urea were dissolved in 100 ml. of methyl alcohol and shaken with 1 g. of 5% palladium carbon in a hydrogen atmosphere. 470 ml. of hydrogen were taken up within 3 hours. The catalyst was filtered off. After the addition of 2.5 g. of non-aqueous oxalic acid in 20 ml. of methyl alcohol the filtrate was evaporated to dryness. The residue was recrystallized from methyl alcohol, yielding N-(ω-methylhydrazino-decyl)-N'-phenyl urea oxalate as colourless crystals melting at 122–125° C.

The N-ω-bromodecyl-N'-phenyl urea used as starting material could be prepared as follows:

A solution of 26.5 g. of ω-bromo-hendecanoic acid in 100 ml. of absolute benzene was supplied with 20 ml. of thionyl chloride and heated to boiling for 30 minutes. The solvent was evaporated off under reduced pressure. The remaining slightly yellow coloured oil was thereafter taken up in 100 ml. of absolute toluene and heated under reflux for 4 hours after the addition of 7.2 g. of sodium azide (activated according to Thiele). 2.2 l. of nitrogen was thereby set free. The brown reaction mixture was filtered, the clear solution supplied with 10 g. of freshly distilled aniline and heated briefly to 80° C. The crystals which separated off after standing for two hours at room temperature were separated off and recrystallized from acetonitrile, yielding N-ω-bromodecyl-N'-phenyl urea as colourless needles, which melted at 93° C. after renewed recrystallization.

We claim:

1. A compound selected from the group consisting of compounds of the formula

A—NH—NH—CH₃ and corresponding azo of the formula A—N=N—CH₃ and azoxy of the formula A—N(O)N—CH₃ compounds, and acid addition salts thereof; wherein A is selected from the group consisting of lower alkyl of up to 10 carbon atoms, lower alkenyl and cyclo-lower alkyl moieties substituted by at least one substituent selected from the group consisting of halogen, (2-methylhydrazino)-lower alkylamino-lower alkyl, lower alkylamino-lower alkoxy, di-lower alkylamino-lower alkoxy, allophanoyl, lower alkylallophanoyl, carbamoyl, lower alkylcarbamoyl, di-lower alkylcarbamoyl, N-phenylcarbamoyl, N-benzothiazolylcarbamoyl, N-(lower alkylthio-lower alkyl)-carbamoyl, N-(carbamoyl-lower alkyl)-carbamoyl, N-(lower alkyl-sulfonyl-lower alkyl)-carbamoyl, N-(halo-lower alkyl)-carbamoyl, N-(lower alkenyl)-carbamoyl, N-(phenyl-lower alkyl)-carbamoyl, N-furfuryl-carbamoyl, N-cyclo-lower alkylcarbamoyl, N-(lower alkylamino-lower alkyl)-carbamoyl, N-(di-lower alkylamino-lower alkyl)-carbamoyl, N-(2-methylhydrazino-lower alkyl)-carbamoyl, N,N-(lower alkylene)-carbamoyl, phthalimido, an acylamino moiety of the formula

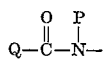

wherein Q is selected from the group consisting of lower alkyl, phenyl, a monocyclic 5 to 6 membered heterocyclic ring moiety containing 1 to 2 heteroatoms selected from the group consisting of oxygen and nitrogen and wherein the heterocyclic moiety can bear a lower alkyl substituent; P is hydrogen or lower alkyl,
ureido, phenylureido, lower alkylureido, hydroxy-lower alkylureido, (2 - methylhydrazino) - lower alkylureido, thioureido, guanidino, lower alkylguanidino, hydroxy-lower alkylguanidino, amidino, lower alkylamidino, di-lower alkylamidino, cyclo-lower alkylamidino, phenyl-lower alkylamidino, phenylamidino, isoxazoylamidino, lower alkanoyl, benzoyl, (2-methylhydrazino)-methyl, (2-methylhdrazino)-lower alkoxy and (2-methylhydrazino)-lower alkanoyl.

2. A compound of the formula

H₃C—NH—NH—R₁—NH—NH—CH₃ wherein R₁ is alkylene containing up to 10 carbon atoms.

3. 1,3-bis-(methylhydrazino)-propane.
4. 1,4-bis-(methylhydrazino)-butane.
5. 1,5-bis-(methylhydrazino)-pentane.
6. A compound of the formula

H₃C—NH—NH—R₂—NH—NH—CH₃ wherein R₂ is lower alkenylene.

7. 1,10-bis-(methylhydrazino)-decane.
8. Bis-(methylhydrazinomethyl)-cyclohexane.
9. A compound of the formula

H₃C—NH—NH—CH₂—R₃—CH₂—NH—NH—CH₃ wherein R₃ is lower cycloalkyl.

10. 1,2-bis-(methylhydrazinomethyl)-cyclopropane.
11. A compound of the formula

X—R—NH—NH—CH₃ wherein R is lower alkenylene and X is selected from the group consisting of halo and 2-methylhydrazino.

12. 1-methyl-2-(3-chloro-2-butenyl)-hydrazine.
13. 1,4-bis(2-methylhydrazino)-2-butene.
14. A compound of the formula

R″—O—R′—NH—NH—CH₃ wherein R' is alkylene containing up to 10 carbon atoms and R″ is (2-methylhydrazino)-lower alkyl.

15. A compound of the formula

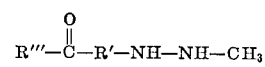

wherein R' is alkylene containing up to 10 carbon atoms and R‴ is selected from the group consisting of amino, anilino, benzothiazolylamino, lower alkyl and ureido.

16. A compound of the formula

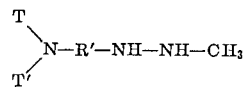

wherein R' is alkylene containing up to 10 carbon atoms; T is phenylcarbamoyl and T' is selected from the group consisting of hydrogen and lower alkyl.

References Cited by the Examiner

UNITED STATES PATENTS 3,110,730  11/1963  Gever et al. _____ 260—583
3,157,616  11/1964  Stewart _____ 260—583

FOREIGN PATENTS 214,907  5/1961  Australia.

OTHER REFERENCES

Benoit (I), Bull. Soc. Chim. France, 5th Series, volume 6, pp. 708–715 (1939).

Benoit (II), Bull. Soc. Chim. France, 5th Series, volume 14, pp. 242–244 (1947).

Blomquist et al., J.A.C.S., vol. 81, pp. 2012–2017 (1959).

Daeniker et al., Helv. Chim. Acta, volume 40, pp. 918–932 (1957).

Ebnother et al., Helv. Chim. Acta, volume 42, pp. 533–542 (1959).

Gever, J.A.C.S., volume 76, pp. 1283–1285 (1954).

Goldschmidt et al., Ann. Der. Chem., volume 595, pp. 179–192 (1955).

Hinman et al., J. Org. Chem., volume 21, pp. 1539–1540 (1956).

Pollak et al., J. Org. Chem., volume 25, pp. 44–46 (1960).

Vogel et al., Ann. Der. Chem., volume 644, pp. 172–188 (1961).

CHARLES B. PARKER, *Primary Examiner.*

FLOYD D. HIGEL, *Assistant Examiner.*

UNITED STATES PATENT OFFICE
CERTIFICATE OF CORRECTION

Patent No. 3,272,839                          September 13, 1966

Werner Bollag et al.

It is hereby certified that error appears in the above numbered patent requiring correction and that the said Letters Patent should read as corrected below.

Column 3, line 68, for "N-lower alkylsulfonyl-" read -- N-(lower alkylsulfonyl- --; column 5, line 56, for "later" read -- latter --; column 7, line 14, for "-pentane/dihydrochloride" read -- -pentane dihydrochloride --; column 10, line 66, for "200 m." read -- 200 ml. --; column 11, line 28, for "1,2,-diacetyl-" read -- 1,2-diacetyl- --; line 62, for "of ml." read -- of 5 ml. --; column 12, line 11, for "toor" read -- torr --; line 14, for "2N hydrochloric" read -- 2N aqueous hydrochloric --; line 63, for "exaporation" read -- evaporation --; column 14, line 12, for "decanolylamino-" read -- decanoylamino- --; column 16, line 50, for "Australia" read -- Austria --.

Signed and sealed this 5th day of September 1967.

(SEAL)
Attest:

ERNEST W. SWIDER                          EDWARD J. BRENNER
Attesting Officer                      Commissioner of Patents